J. O. KING.
METHOD OF CONSTRUCTING PNEUMATIC TIRE SHOES.
APPLICATION FILED MAY 9, 1917.
1,262,513.
Patented Apr. 9, 1918.
2 SHEETS—SHEET 2.
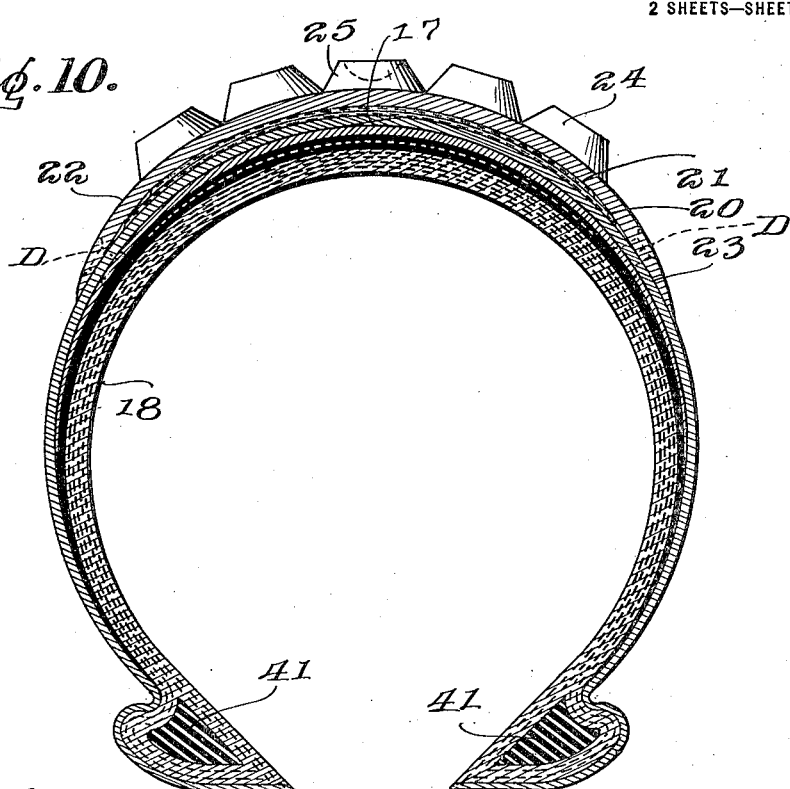
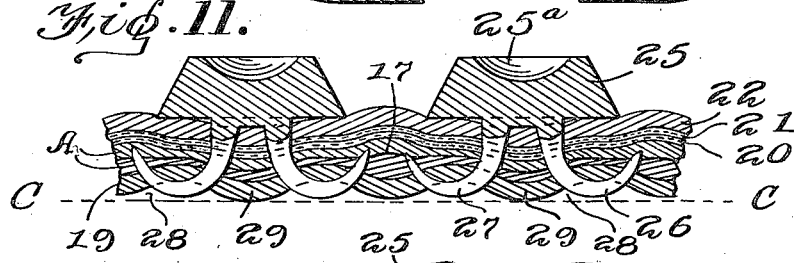
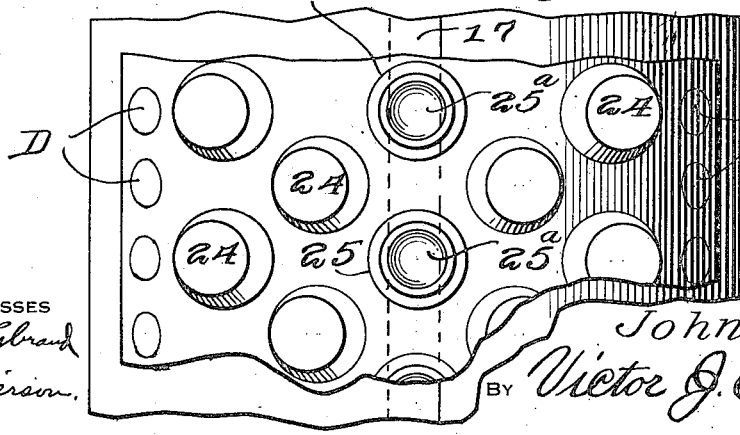
INVENTOR
John O. King
BY Victor J. Evans
ATTORNEY
WITNESSES

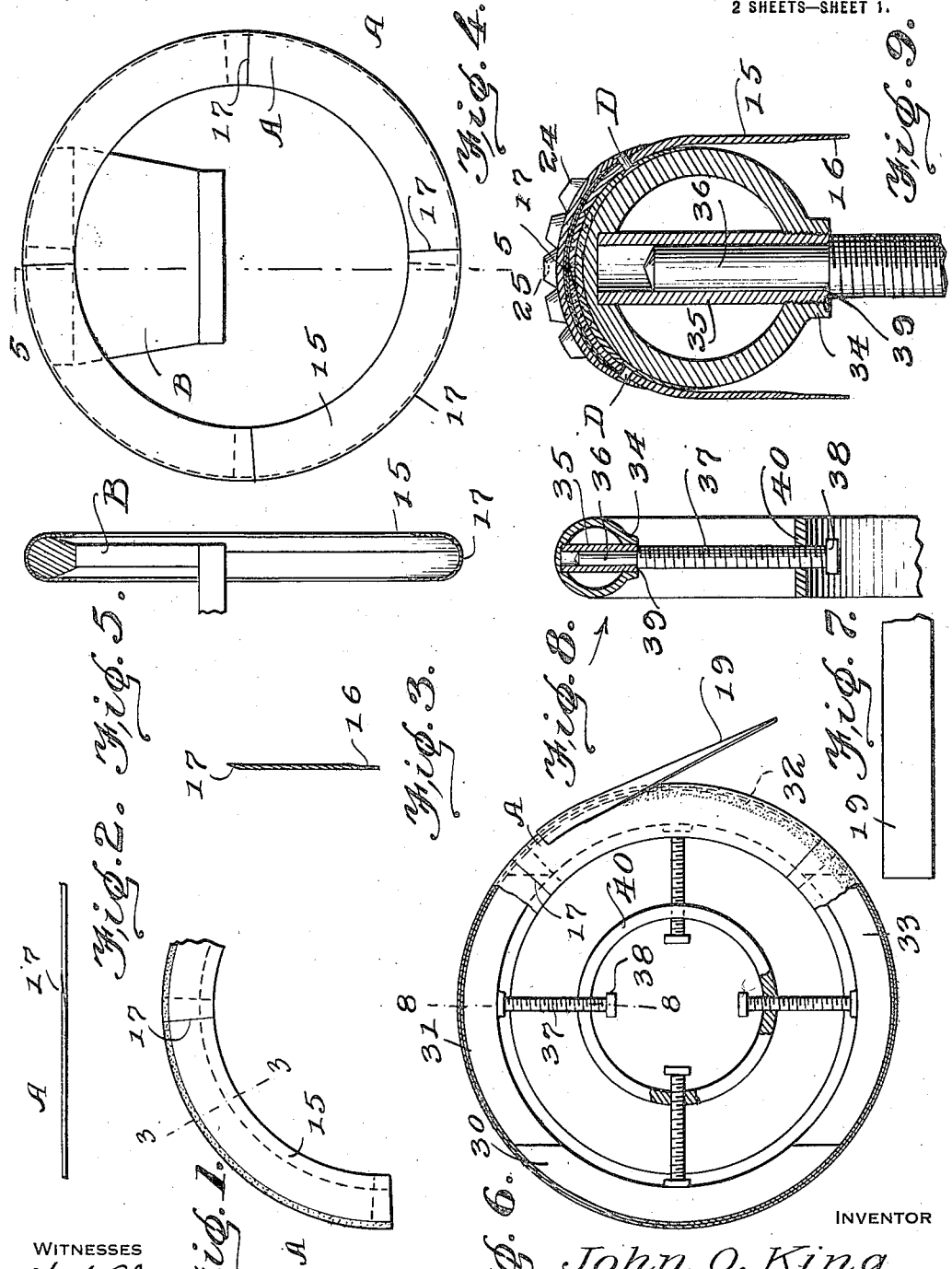

UNITED STATES PATENT OFFICE.

JOHN O. KING, OF MIDWAY, PENNSYLVANIA, ASSIGNOR TO THE KING LEATHER TIRE COMPANY, INC., OF BALTIMORE, MARYLAND, A CORPORATION OF MARYLAND.

METHOD OF CONSTRUCTING PNEUMATIC-TIRE SHOES.

1,262,513.  Specification of Letters Patent.  Patented Apr. 9, 1918.

Application filed May 9, 1917. Serial No. 167,529.

*To all whom it may concern:*

Be it known that I, JOHN O. KING, a citizen of the United States, residing at Midway, in the county of Washington and State of Pennsylvania, have invented new and useful Improvements in Methods of Constructing Pneumatic-Tire Shoes, of which the following is a specification.

This invention is a method of constructing or building a shoe or casing for pneumatic tires, wherein a carcass may be employed as a foundation to which may be applied successive plies of leather adhesively secured together, through which pass metal studs having clenched shanks to form a unitary structure with the carcass, and is an improvement over the method disclosed in my Patent No. 931,207, issued August 17, 1907.

One object of the invention is to make a simple and efficient puncture-proof shoe or casing formed of successively secured plies of leather.

Another object is to produce a casing built of plies of leather, one of which encircles the carcass, and another of which serves as a tread which is secured to said latter ply, and interposing between the plies binding strips of fabric that have previously been moistened and permitted to dry while stretched under tension.

A further object is to produce a shoe or casing wherein the several plies of leather are united by adhesion and also in a mechanical manner to form a unitary structure with a foundation fabric body or carcass.

A still further object is to produce a casing with a rubberized fabric carcass and having secured thereto by adhesion plies of chrome leather, which plies are also secured together in a mechanical manner, said plies being of different widths to have a stepped relation with each other, and then interposing between certain of the plies, shrunk and rubberized fabrics to form binding strips.

A still further object is to produce a tire built up of overlapping plies of leather having binding strips of rubberized fabric, incapable of stretching, interposed between the tread strip and the padding, then securing the several plies of leather and fabric together by means of metal studs having split shanks whose ends are recurved to clench, which produces a depression on the underside of the padding ply and serves to prevent the recurved or clenched shanks from contacting with a foundation fabric or carcass to which the several plies are afterward secured, and then securing the plies together by means of rivets located at spaced intervals along the edges of the tread ply.

The method, broadly stated, consists of the following steps:—

First, in forming a padding of leather as a shell that is U-shaped in cross-section, shaping the leather shell upon a mold, then removing the shell from the mold and replacing it thereon in a reversed position, adhesively securing thereto a leather reinforcing ply of less width than the shell but disposed to extend and encircle said shell, then removing the shell from the mold and replacing it thereon in its original position, which places the reinforcing strip against the outer surface of the mold, then securing to the padding or shell layers of fabric having different widths to serve as binding strips, these strips having been previously moistened and stretched under tension, and then permitted to dry while being so stretched, then attaching or securing a tread strip or ply of leather whose width is greater than one of the binding strips, then securing the several plies of leather and fabric together by means of metal studs having clencher shanks, which in clenching recurve toward the head and serve to compress the several plies of leather and fabric in such a manner that adjacent the recurved portions a depression is formed, and the ends of the shanks being so disposed that they lie adjacent each other and thus form a protection to the space lying between adjacent studs, the edges of the tread strip being also secured to the padding and reinforcing strips by rivets, then placing the padding or shell with its accompanying plies of leather and fabric upon an expansible mold so as to reform or shape the product, the mold then being removed and the product prepared to receive a foundation fabric body or carcass, that has similarly been prepared so that the product and carcass may be firmly united in an adhesive manner, the carcass and its shell again being placed upon the mold until the several parts adhere to each other in a firm and substantial manner, the operation of securing or attaching the padding or shell to the carcass being such that the exterior surface of the carcass is covered by the padding or shell, and in order to provide for making the several joints in a workman-like manner so that the joints present smooth surfaces, the edges of the tread strip and the reinforcing strip being skived and the padding or shell also having its edges skived so that it will conform to the contour of the carcass where it contacts with the rim, and thus avoid wrinkling or creasing of the shell.

One way of carrying out this method of forming shoes or casings with its several steps and some of the appliances used, will be described and illustrated in the accompanying drawings, in which:—

Figure 1 is a fragmentary view of the padding or shell;

Fig. 2 is an edge view of one of the joints that may be employed in the formation of the shell;

Fig. 3 is a sectional view on the line 3—3 of Fig. 1;

Fig. 4 is a side elevation of the shell or padding in position upon a preliminary mold;

Fig. 5 is a sectional view on the line 5—5 of Fig. 4;

Fig. 6 is a side elevation partly in section of the expansible mold having the shell or padding thereon in a reversed position with the reinforcing strip partly applied;

Fig. 7 is a plan view of a portion of the reinforcing strip;

Fig. 8 is a sectional view through one portion of the mold and an adjusting screw, on the line 8—8 of Fig. 6;

Fig. 9 is an enlarged sectional view showing the manner of guiding the ends of the adjusting screw within the body of the mold;

Fig. 10 is a sectional view of the completed tire or casing;

Fig. 11 is an enlarged sectional view showing the metal studs, the shanks of which are clenching the several plies of leather and fabric together, and also illustrates the depressions formed adjacent the recurving shanks; and Fig. 12 is a fragmentary top plan view showing the tread surface of the shoe or casing.

In the preferred method of building a metal-studded, leather, pneumatic tire shoe or casing, the padding is preferably composed of segments 15, the general shapes of which are shown more particularly in Figs. 1 and 4. These segments are usually made of soft dry chrome tanned leather. As shown in the figures mentioned, the padding or shell, which may be generally indicated by the letter A is formed of eight pieces. This method of cutting the leather is employed to avoid waste, and also for the purpose of producing a better shape in the padding or shell during its forming and shaping period, and also during later operations, the ends of each of the segments being scarfed or skived as well as their lateral edges. The scarfing or skiving of one side and the ends is done to produce a smooth lapped joint 17, when the several segments are adhesively secured together, the type of joint being illustrated in Fig. 2.

It is preferred to adhesively secure the several segments together in order that smooth surfaces may be presented both interiorly and exteriorly. The several segments may be preliminarily joined together by using the shaper or mold B, shown more particularly in Figs. 4 and 5, although if desired the foundation fabric body or carcass 18 may be employed as the mold. If the carcass be employed some means must be used in order to maintain the carcass so that it will retain its proper shape during the time when the several segments are being drawn together. During this preliminary stage of forming the padding or shell, there is no appreciable stretching of the several segments. When the padding or shell has been formed it is substantially U-shaped in cross-section, its general contour being shown more particularly in Fig. 9.

When the several segments have been firmly secured together in a permanent manner, the shell or padding is removed from its preliminary molding or shaping position, and turned wrong side out. It is then replaced upon the mold in its reversed position. It is now ready to have the reinforcing strip 19 attached thereto. The median lines or periphery of the shell are prepared for adhesively securing the reinforcing strip in a permanent manner. This reinforcing strip is preferably formed of leather of the same general type and kind as that employed for the padding or shell A. The reinforcing strip 19 is of considerably less width than the width of the U or shell to which it is attached. This is more clearly shown in Fig. 6.

After the reinforcing strip is found to be securely attached to the padding or shell, the shell is removed from the mold and restored to its former shape, which places the reinforcing strip interiorly of the shell, at the bottom of the curved portion of the U. The shell is then replaced upon its mold so that the reinforcing strip 19 is in contact therewith. Part of the exterior surface of the shell is then prepared so that a cushion of suitable binding strips 20 and 21 may be secured thereto.

The binding strip 20 is preferably of a greater width than the strip 21. In order to form these strips they are first thoroughly soaked, and are then extended under tension and permitted to dry while so extended. This is done so that when attached to the shell or padding there will be no further stretching. If desired, the fabric may be impregnated with a rubber compound, so as to form a rubberized fabric. These binding strips are used more particularly for the purpose of better securing the shell or padding A with the tread strip 22.

The tread strip 22 is preferably formed of leather of the same type as that of the shell and reinforcing strip and it is of greater width than the binding strip 20. The lateral edges of this tread strip 22 are also skived as indicated at 23, so as to form a substantially smooth joint so that the exterior of the shoe or casing is preferably smooth.

After the several plies of leather and fabric are firmly secured together, the product is removed from the mold and the metal studs indicated at 24 and 25 are inserted. These studs 24 and 25 are provided with shanks, which shanks are split so as to provide the clenching portions 26 and 27. It is preferred to apply these studs by means of a machine, so that the clenching portions 26 and 27 are passed through all of the several plies of leather and fabric and their ends are then bent outward and upward in a recurved position, thus reëntering certain plies of leather. In Fig. 11, the recurving and clenching is particularly well illustrated, and it also shows the points of the shanks as lying adjacent to the points of another stud. The two points lying adjacent serve as a protection and lessens the liability of puncture of the material lying between the heads of the studs.

In Fig. 12, two styles of studs are employed, those indicated at 24 being preferably formed with flat faces and sloping sides, and may be formed of relatively soft steel. The studs indicated at 25 are of the same general outline but instead of flat faces, the cup portions or depressions indicated at 25ª are formed therein. These cupped studs are preferably arranged in a circumferential line so that they will be subjected to the greatest amount of wear. These studs 25 are preferably hardened so as to eliminate wear, and the relative degrees of hardness existing between the studs 24 and 25 is such that the wear between them will be uniform.

As shown in Fig. 12, the studs are provided with the same diametered heads, but they may be made with heads of different diameters if so desired. It may be found in practice better to make the cupped studs the larger ones.

As will be seen from Fig. 11, when the shanks 26 and 27 are recurved and clench the several plies of leather and fabric together, certain portions of these plies are compressed more than others and form depressions indicated at 28, which lie adjacent the recurved portion. The plies of leather and fabric lying between the shanks or clenching portions 26 and 27, as indicated at 29, are practically uncompressed.

After the metal studs have been applied to the product, rivets indicated at D are applied along the lateral edges of the tread strip 22, which rivets pass through the tread strip, the padding or shell, and the reinforcing strip. These rivets may be of any type, style, or description, which will best adapt them to perform their function.

When the product has been studded and riveted, its size has been decreased to a certain width, so that it cannot be readily attached to the carcass 18. The product must then be stretched sufficiently so that it will form a close adhering covering for the carcass. In order to do this, it should be stretched or expanded equally in all directions, so that no undue strain will be placed upon any particular portion or section. If it is desired to stretch and reform or shape the product, a sectional mold, the sections of which are indicated at 30, 31, 32, and 33, may be employed. If desired, each of these sections may be made circular in cross-section, and at desired points a boss 34 is provided, which boss has internal threads to coöperate with a sleeve or guide member 35, which also has threads formed thereon to coöperate with the internal threads of the boss. As shown more particularly in Fig. 9, where a sectional view through one of the sections is illustrated, the mold is circular upon its interior, and the sleeve passes through from the boss 34 to the opposite wall of the section. As is also shown in this figure, one end of the sleeve 35 is adapted to fit in a suitable recess, which recess holds the sleeve against movement when in coöperation with the internal threads of the boss 34.

To coöperate with the sleeve 35, a bolt is provided having a cylindrical end indicated at 36, which is of smaller diameter than the threaded portion 37. This bolt is further provided with a square head 38, as shown. The head 38 may be replaced by a hand wheel of other suitable means which will serve to turn the bolt. A shouldered portion 39 formed between the cylindrical portion 36 and the threaded portion 37 is adapted to bear against the exterior end of the sleeve 35, or if desired it may also coöperate with the boss 34, so as to provide a larger or greater bearing surface and area. The bolts are preferably passed through a ring-like member 40 that is provided with equidistant spaced threaded holes, the threads of which are adapted to coöperate with the threaded portions 37 of the bolts. The ring member 40 may be formed as a spider if so desired.

As shown more particularly in Fig. 6, the sections 31 and 33 are so formed that they may be withdrawn from contact or engagement with the sections 30 and 32. This is done in order to facilitate the placing of the finished product upon the mold. When it is desired to stretch the product, the sections 31 and 33 are withdrawn or removed from the mold and the sections 30 and 32 are drawn inward toward the center by means of the bolts. This will permit the product to be readily positioned upon the two sections 30 and 32. After such positioning the bolts are rotated, which forces the sections 30 and 32 outward a sufficient distance so that the sections 31 and 33 may enter and engage with the respective ends of the sections 30 and 32. The sections 31 and 33 are forced outward until their peripheries are continuous with the peripheries of the sections 30 and 32.

After the several peripheries become continuous and form a single periphery for the entire mold, the mold has reached its proper size or has become of the proper diameter, and the product has been stretched the required amount to receive the carcass 18. As the several sections are moved redially by means of their respective bolts, the pin or cylindrical portion 36 is guided by means of the sleeve 35. It is not required to stretch the finished product any more than is absolutely necessary as it is desired that when the product is attached to the carcass the product will hug or grip the carcass in a firm manner.

After the finished product has been stretched the required amount, the sections 31 and 33 are removed from the mold and the sections 30 and 32 are drawn inward. The product is then removed and its interior is prepared with a suitable adhesive to engage with the carcass 18, whose exterior surface has been similarly prepared. The carcass is then inserted into the product and an inner tube or air bag may be inserted into the carcass and the whole assembled upon a suitable rim. The inner tube or air bag may be inflated, which tends to force the carcass into engagement with the product and the product by reason of its non-stretching ability tends to grip and hug the carcass in a firm manner. At the same time the skived lateral edges of the finished product are forced into engagement with the rim holding section or portion of the carcass.

The air is maintained within the tube or bag a sufficient length of time so that the product and carcass are firmly joined together or attached to each other. If desired another sectional mold similar to the one shown in Fig. 6 may be employed, which forms an inner mold for the latter operation of joining the carcass and product together. When the interior of the product is being prepared for securement to the carcass, the several depressions indicated at 28 are filled up and also serve to afford better attaching means than a perfectly smooth surface. These depressions which are formed during the clenching of the shanks of the studs also serve to maintain the recurved portions away from contact with the carcass 18. The line c—c in Fig. 11, representing the exterior surface of the carcass 18, clearly indictates that these depressions may be filled. The filling of the depressions 28 also adapts them to serve as cushions between the exterior surface of the carcass and the padding 19 adjacent the recurved shanks of the metal studs.

As shown in Fig. 10, the foundation fabric body or carcass 18 is provided with beads 41, which construction of the carcass is usual when employed for quick detachable shoes or casings. The carcass 18 is shown merely for illustrative purposes, as other types, such as the straight side or clencher, may be employed.

Minor changes in the form, proportions, and details of construction may be resorted to without departing from the spirit of the invention or the scope of the appended claims.

What is claimed as new is:—

1. A method of making metal studded pneumatic tire casings or shoes which consists in forming a padding of leather as a shell that is U-shaped in cross-section, shaping the shell upon a mold, then removing the shell from the mold and replacing it thereon in a reversed position, adhesively securing thereto a leather reinforcing ply disposed along the median lines of the shell, again removing the shell from the mold and replacing it thereon in its original position, then successively securing to the padding, binding strips, and to the binding strips, a leather tread, securing metal studs to the tread strip so that the shanks of the studs pass through the plies of leather and fabric, stretching the structure so formed on a mold, removing a portion of the mold and inserting a foundation tire fabric body or carcass, and then securing the formed structure thereto so that it conforms to the external contour of the body with which it forms a unitary shoe or casing.

2. A method of making leather, metal studded, pneumatic tire casings or shoes which consists in forming a padding of leather as a shell that is U-shaped in cross-section, shaping the shell, then securing to the shell upon its inner median line a ply of leather serving as a reinforcing strip, and successively securing to the outer median line plies of binding fabric and a leather tread ply, securing the several plies of leather and fabric together by metal studs having clencher shanks which in clenching or recurving produce depressions adjacent the recurved portions, securing the tread ply to the padding by rivets, and then attaching the structure so formed upon a fabric body or open carcass so that the exterior surface of the body is covered by the structure to form a unitary casing or shoe.

3. A method of making leather pneumatic shoes or casings having metal studs projecting therefrom, which consists in forming an annular padding or shell of leather substantially U-shaped in cross-section; placing the shell upon a mold for shaping; removing, reversing and replacing the shell upon the mold in a reversed position; securing firmly to the periphery a reinforcing strip of leather, the lateral edges of which are skived to provide a smooth joint with the shell; removing the reinforced shell from the mold and replacing it in its original shaping position, thus placing the reinforcing strip interiorly of the shell; attaching binding strips of fabric of different widths to the periphery of the shell, which fabric has been previously stretched and shrunk; securing a leather tread strip over the binding strips of fabric, which tread strip is of greater width than the binding strips and whose edges are skived; inserting metal studs having clenching shanks through the several strips of fabric and leather so that during the clenching depressions in the inner face of the shoe are produced; riveting the lateral edges of the tread strip to bind the several plies of leather together; then stretching the studded and riveted product on an expansible mold; removing the mold; coating the interior surface of the product with an adhesive; inserting into the product a carcass, and introducing the mold within the carcass to exert radial pressure to cause the product to adhere to the external surface of the carcass, thereby making a unit of the product and carcass.

4. A method of making leather pneumatic tire shoes or casings outwardly metal studded, which consists in forming a padding from a series of segments of soft, dry, unfinished leather, joining the several segments together so as to form a shell that is U-shaped in cross-section, applying a cushion ply to the shell, adhesively securing an outer leather tread strip to the shell and over the cushion ply, securing metal studs to the shell, stretching or expanding the shell, and then adhesively securing the shell so formed to an open sided carcass to which said shell is made to conform without closing the opening in said carcass.

5. A method of making metal studded pneumatic tire casings or shoes, which consists in forming a padding of leather as a shell that is U-shaped in cross-section from two rings, the largest circumferences of which are adhesively secured together, shaping the shell on a mold, securing a reinforcing strip of leather upon the interior of the shell and at the bottom thereof, attaching binding strips formed of fabric incapable of stretching to the exterior surface of the shell, then securing a tread strip of greater width than the binding strips to the padding, securing the several plies of leather and fabric together by metallic fastenings, stretching the product so formed upon a mold so as to adapt it to fit upon a foundation fabric body or carcass, preparing the exterior surface of the carcass and the interior surface of the shell for adhesive attachment to each other, placing the carcass within the shell, and subjecting the carcass and shell to pressure which forces the walls of each into intimate contact to form a unitary product.

In testimony whereof I affix my signature.

JOHN O. KING.